March 10, 1925. 1,528,844
G. PAILIN
AUTOMATIC AIR AND OIL BREAK ELECTRIC SWITCH
Filed Aug. 8, 1922 6 Sheets-Sheet 1
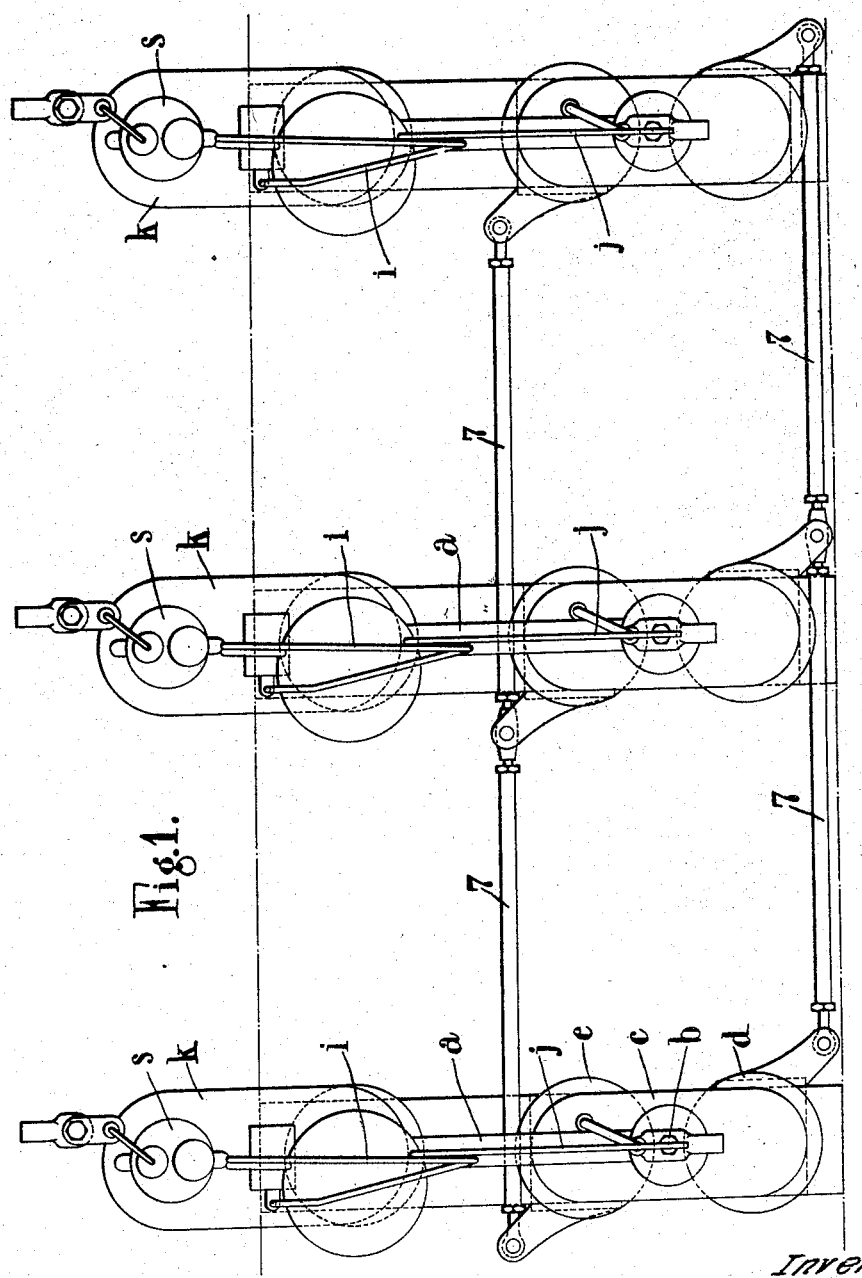
Inventor
G. Pailin
By Marker Clark
Attys March 10, 1925. 1,528,844

G. PAILIN

AUTOMATIC AIR AND OIL BREAK ELECTRIC SWITCH

Filed Aug. 8, 1922 6 Sheets-Sheet 2

March 10, 1925. 1,528,844
G. PAILIN
AUTOMATIC AIR AND OIL BREAK ELECTRIC SWITCH
Filed Aug. 8, 1922 6 Sheets-Sheet 3
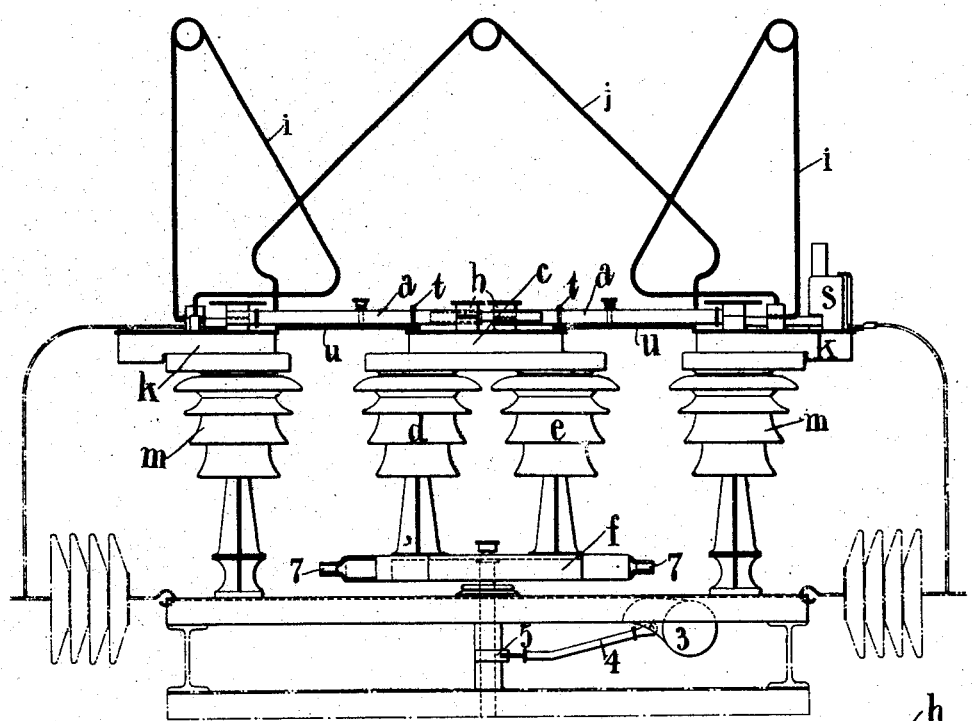
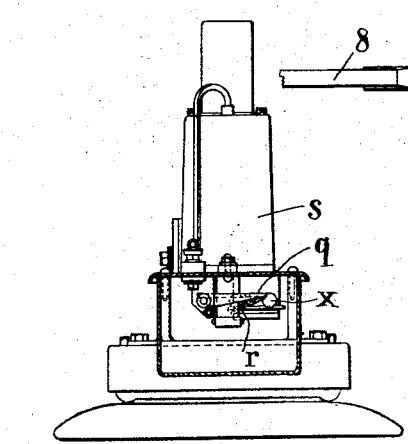
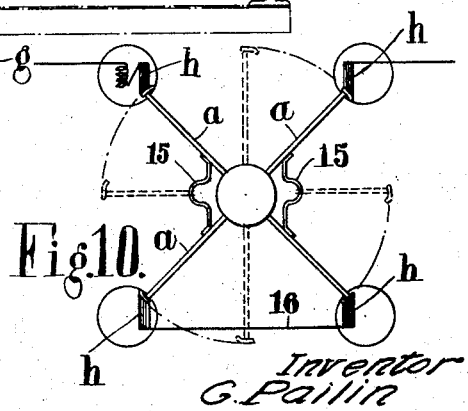

March 10, 1925. 1,528,844
G. PAILIN
AUTOMATIC AIR AND OIL BREAK ELECTRIC SWITCH
Filed Aug. 8, 1922 6 Sheets-Sheet 4

Inventor
G. Pailin
By Mark or Clerk
Attys.

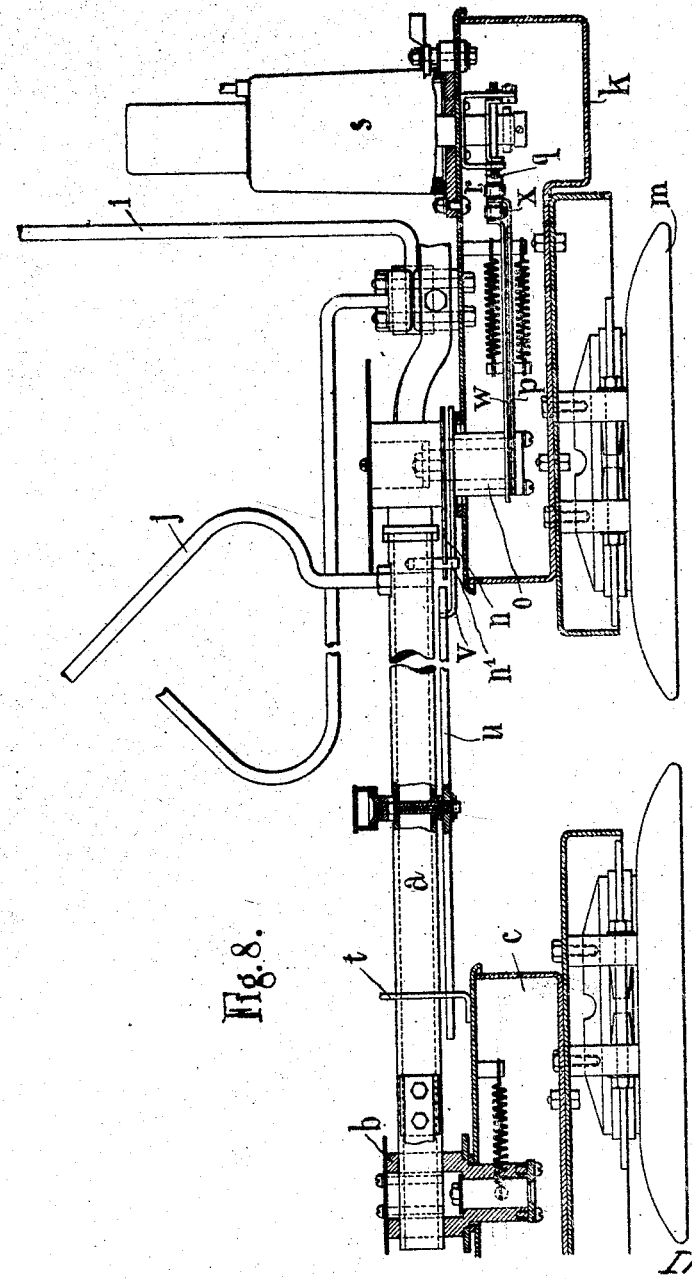

March 10, 1925. 1,528,844
G. PAILIN
AUTOMATIC AIR AND OIL BREAK ELECTRIC SWITCH
Filed Aug. 8, 1922 6 Sheets-Sheet 6
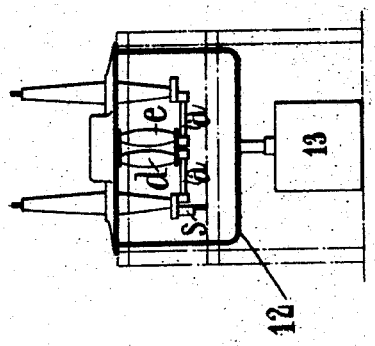
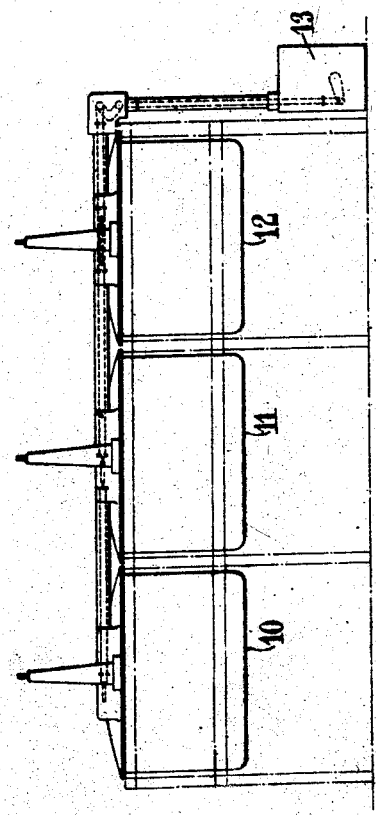
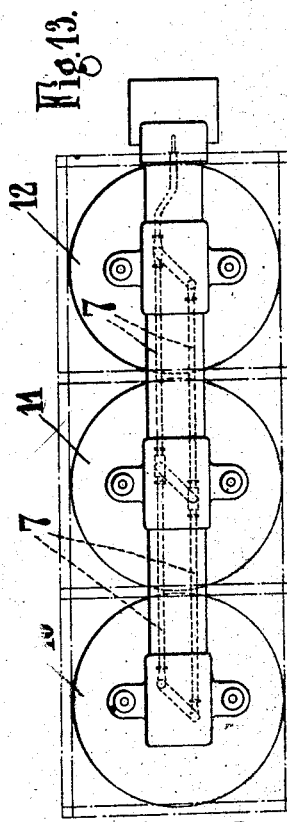
Inventor
G. Pailin
By Marker Clerk
Atty's Patented Mar. 10, 1925.

1,528,844

UNITED STATES PATENT OFFICE.

GEORGE PAILIN, OF MANCHESTER, ENGLAND.

AUTOMATIC AIR AND OIL BREAK ELECTRIC SWITCH.

Application filed August 8, 1922. Serial No. 580,520.

*To all whom it may concern:*

Be it known that I, GEORGE PAILIN, a subject of the King of Great Britain and Ireland, and resident of Buckley Street, Higher Openshaw, Manchester, England, have invented certain new and useful Improvements in Automatic Air and Oil Break Electric Switches, of which the following is a specification.

This invention relates to air and oil break electric switches for high tension current, and has for its object to provide improved means for effecting the automatic opening of the switch in the phase in which the fault occurs and the simultaneous opening of the switch or switches of the other phase or phases without there being any electrical or mechanical connection on the high tension side between the breaking or tripping means of the respective phases and without the necessity for the employment of additional insulators at the switches beyond what are required in the ordinary switch insulation.

My invention comprises the combination with a switch arm insulated from but mounted upon an earthed base capable of a turning or rotary movement, of an automatic catch whereby the said switch arm is held in the circuit closed position and a trip coil or its equivalent capable of releasing the said catch to allow of the opening of the switch, and a mechanical trip device operated from the rotary base of the switch in another phase also capable of releasing the said catch to allow of the opening of the switch when the switch in another phase is opened so that the whole of the phases are broken simultaneously.

My invention further comprises the arrangement of a plurality of electrically interconnected switch arms in each phase with a catch or holding means for the outer end of each arm and means for simultaneously tripping or releasing mechanically the whole of the catches when any one catch is released by an electrical tripping device.

My invention further comprises hand operated means for releasing the whole of the switch arms simultaneously independently of the electrical tripping or releasing mechanism.

My invention further comprises the details of construction and arrangement of the automatic break mechanism hereinafter described.

Referring to the accompanying sheets of explanatory drawings:—

Figure 1 is a plan view of a three phase air break switch of the horn type constructed and arranged in one convenient form in accordance with my invention.

Figure 5 is a view similar to Figure 2 but showing a modified construction of switch in accordance with my invention.

Figure 8 is an elevation, partly in section, drawn to an enlarged scale of the upper right hand portion of Figure 5.

Figure 9 is a detail view of the electrically operated catch device or trip mechanism.

Figure 10 illustrates diagrammatically a switch having four arms in one phase.

Figures 11, 12 and 13 illustrate in front elevation, in sectional end elevation and in plan view respectively the application of my invention to an oil switch.

The same reference letters in the different views indicate the same or similar parts.

In the application of the invention to an air break switch of the horn type, see Figures 1 to 10, each contact bar or switch arm $a$ is pivoted at one end, that is at $b$, upon a base piece $c$ supported by insulators $d$, $e$ upon a pivotally mounted frame $f$. The vertical spindle $g$ turns with the frame $f$. The free end of each contact bar $a$ engages the fixed contact blades $h$ (see Figures 4, 7 and 10) and there is the known arrangement of resilient horns $i$, $j$ associated with the fixed and movable contacts whereby the complete switch closing movement of the bar $a$ is effected against a spring action set up between the said resilient horns when they abut, the energy thus stored up in the horns being subsequently utilized to give a switch opening movement to the said bar on the release of the catch device as hereinafter described.

Figure 3:
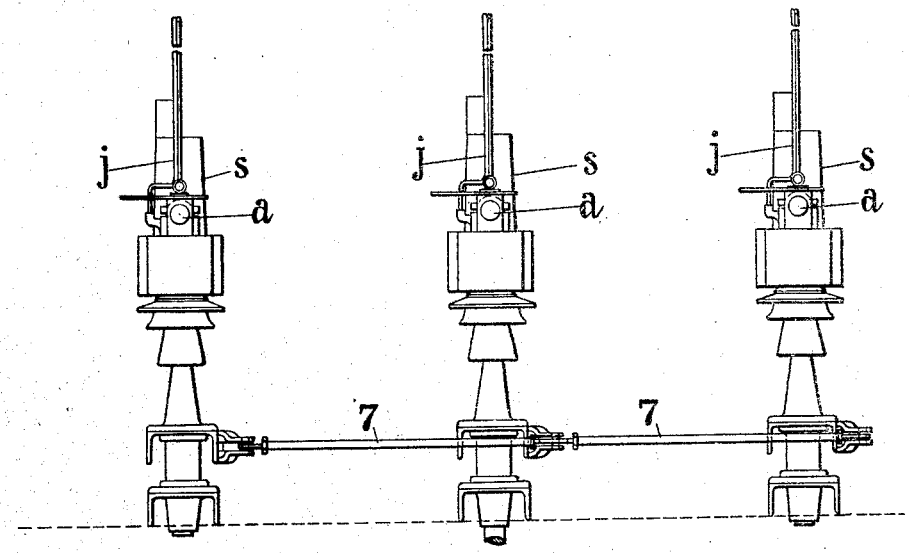
Figure 3 is an end view of the switch mechanism.
Figure 2:
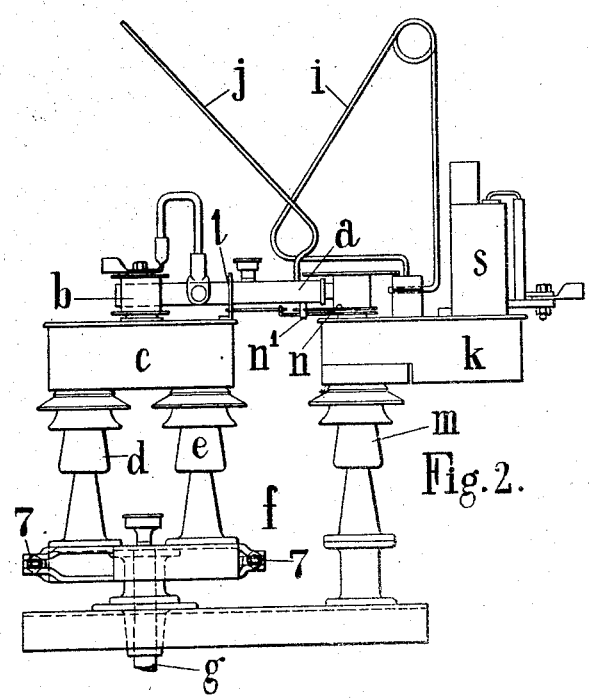
Figure 2 is an elevation of the switch mechanism in one of the phases.
Figure 4:
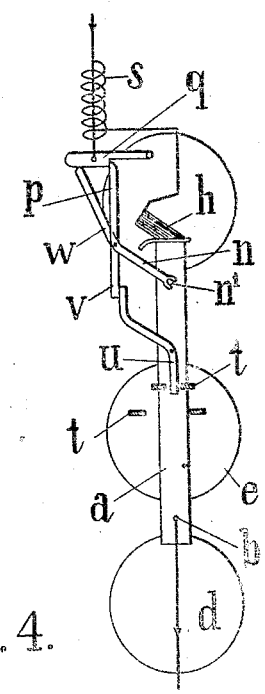
Figure 4 is a diagram illustrating the operation of the break mechanism.
Figure 6:
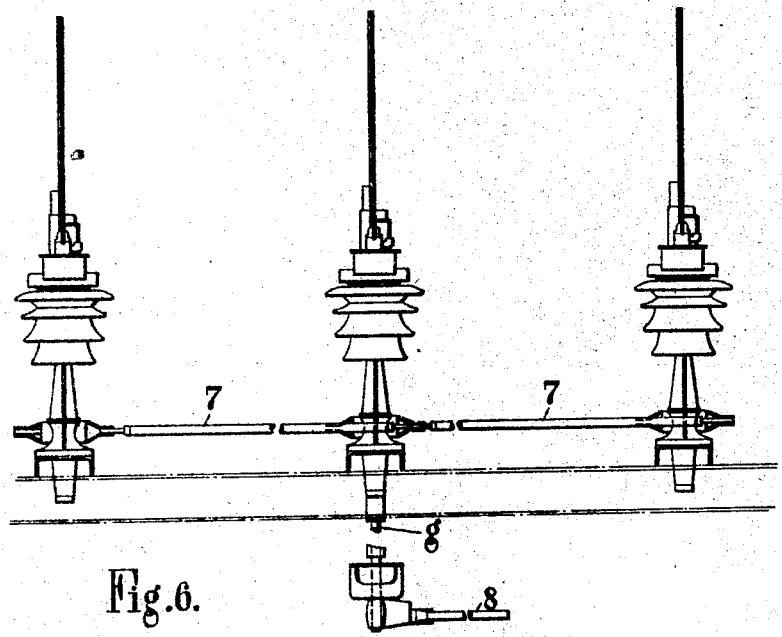
Figure 6 is an end view looking from left to right of Figure 5.
Figure 7:
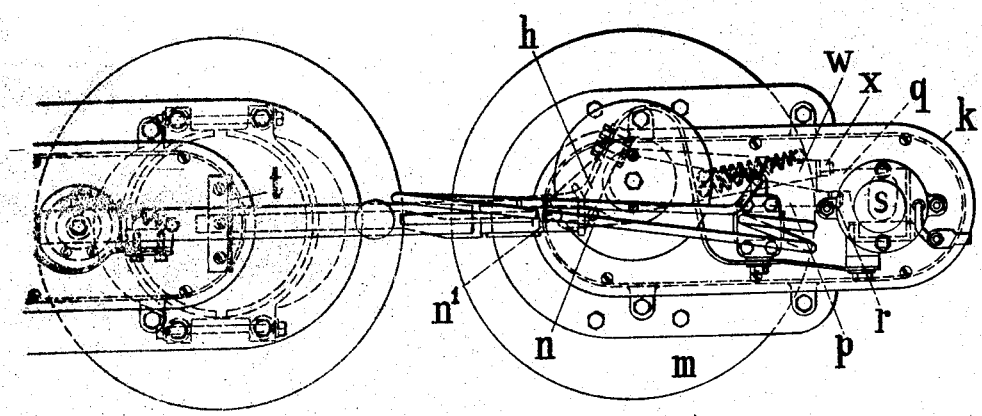
Figure 7 is a plan view drawn to an enlarged scale of the upper right hand portion of Figure 5.

Pivoted upon the base $k$ carried by the insulators $m$ and carrying the fixed contact blades is an arm $n$ (hereinafter termed a locking lever) which is bifurcated as shown and formed integrally with a boss $o$ carrying an arm $p$ which co-operates with a catch piece $q$ (see Figures 4, 7 and 8). One arm or prong of the bifurcated or forked end of the locking lever is longer than the other arm (see Figure 7) and a projecting peg or lug $n^1$ upon the contact bar or switch arm $a$ is adapted, when the latter is moved to close the switch, to turn the said lever $n$ until the peg or lug $n^1$ enters the slot in the forked end thereof and the catch $q$ engages the arm $p$ to lock the lever against a reverse rotary movement. The switch is now held closed. Figure 7 shows the switch arm and associated parts in the closed position.

The catch device consists of a blade like part $q$ which is raised by the roller $r$ upon the end of the arm $p$ and then falls behind said roller (as shown in Figures 7 and 9). It can be raised thereafter either by a trip coil or equivalent electrical device shown at $s$ (Figures 8 and 9) for automatically releasing the locking lever $n$ under overload or other abnormal conditions, or by a mechanical tripping device operated by hand or mechanically from the switches in other phases of the high tension circuit in which overload or fault conditions have occurred as hereinafter described.

The mechanical operation of the catch device $q$ is effected as follows:—The contact bar $a$ passes through a slotted plate or bracket $t$ upon the base $c$, the said plate allowing of a small amount of relative movement between the bar $a$ and its supporting base $c$. Upon the contact bar is also pivotally mounted a lever $u$, one end of which passes through a slot in the aforesaid slotted plate $t$, whilst the other end is adapted to engage one end of an arm $v$ formed integrally with a boss carrying the arm $w$ which has a roller $x$ thereon for engaging and raising the catch device $q$ and releasing the locking lever $n$. To operate the said arms $v$ and $w$ which constitute a mechanical trip lever, the pivotally mounted support $f$ upon which the contact bar is pivotally mounted, has a rotary movement imparted thereto as hereinafter described. By reason of the elongated slot in the slotted plate $t$ through which the contact bar $a$ passes, such movement does not open the switch directly by turning said arm, but the slotted plate carries with it one end of the lever $u$ pivoted upon the contact bar and so turns said lever about its pivot. The other end of said lever turns the trip lever $v$, $w$ about its pivot and causes the roller $x$ thereon to engage and raise the catch device $q$ and so release the locking lever $n$; the horns $i$, $j$ acting upon the contact bar then move it clear of the fixed contact blades $h$. To complete the opening movement of the contact bar, I provide a weight 3 (see Figure 5) upon a pivoted arm connected by a link 4 to an arm 5 upon the spindle $g$ carrying the base $f$ supporting the insulators and contact bar $a$. When the latter is in its closed position, the arm 5 upon said spindle is in line with the connecting link 4 and the weight 3 exerts no turning moment upon the spindle $g$, but when the opening movement of the contact bar has been started by the horns $i$, $j$, the arm 5 and link 4 pass out of line and through their angularity the weight 3 then acts to turn the contact bar and associated parts into their out-of-service position at right angles to their service position.

It will be understood that with the construction shown in Figures 1 to 4, there is one contact bar $a$ with its associated locking and releasing mechanism for each phase and that the earthed pivotally mounted bases $f$ of the respective contact bars are inter-connected by links 7 so that if one base be turned either by hand through a suitable operating handle as 8 (see Figures 5 and 6) on the spindle $g$, or by the resilient or spring like horns $i$, $j$ on the automatic release of the catch device $q$ by the electrical trip mechanism $s$, then the mechanical trip mechanism of the switches in the remaining phases will be operated to open all the switches as hereinbefore described.

Instead of employing one pivoted contact bar $a$ in each phase, I may provide two or more such bars, each pivoted upon the rotatable base $c$ so that there are holding on catches at all ends of the switch, which ensures effective contact notwithstanding any tilting movement of the pivotal base.

In Figures 5 to 9 there are two switch arms $a$ pivotally carried by each rotatable base $c$, the end of each arm which engages the fixed contacts being held in the switch closed position by a locking lever as $n$ and being releasable by the mechanical trip mechanism previously described. An electrical trip coil is arranged in conjunction with one switch arm only in any one phase. When the locking mechanism for the end of one contact arm is tripped by the electrical trip gear, the arm turns about its pivot, then engages the end of the slot in the bracket $t$, turns its base piece $c$ to cause the mechanical tripping of the other arm in the same phase and by means of the links 7 turning the remaining bases $c$ to cause the mechanical tripping of the switches of the other phases.

In the arrangement shown in Figure 10, there are four switch arms $a$ in each phase, the arms being electrically coupled in pairs by the flexible conductors 15 and by the external connection 16 to give a series connection through the arms.

It will be seen that with my improved construction and arrangement of switches with their locking and releasing mechanism, the insulators required are only such as are necessary for switch insulation as there is no interconnection on the high tension side between the respective tripping devices or between the live trip coil and earth.

The complete switch mechanism without the horns may be inverted and immersed in oil to form an oil break switch. This application of my invention is illustrated in Figures 11 to 13, where the oil tanks are shown at 10, 11 and 12. The mechanical operation of the switch is effected through ordinary and well known mechanism for actuation by hand and disposed in part within the box 13 and acting through the links 7. The general arrangement of the complete switch is similar to that shown in the preceding figures. The contact bars or switch arms as $a$ are mounted at the lower ends of insulators $d$ and $e$ secured at their upper ends to the under side of rotatable supports which, as in the previous examples described herein, are connected by links 7.

I do not limit myself to the details of construction hereinbefore described but may modify the same to suit requirements.

I claim:—

1. In electric switches, the combination comprising a switch arm, a rotatable base carrying said arm, a fixed base adjacent said rotatable base and having mounted thereon switch arm contact blades, a locking lever and catch with means for electrically tripping said catch, and means on said arm for mechanically tripping said catch, as set forth.

2. In electric switches, the combination comprising a switch arm, a rotatable base carrying said arm, means permitting of a movement of said base relatively to said arm, a fixed base adjacent said rotatable base and having mounted thereon switch arm contact blades, a locking lever and catch with means for electrically tripping said catch, and means on said arm whereby the movement of said rotatable base relatively to said arm effects the mechanical tripping of said catch, as set forth.

3. In electric switches, the combination with a fixed base having mounted thereon contact blades, a locking lever and catch with means for electrically tripping said catch, of a rotatable base, a switch arm having one end in pivotal connection with said rotatable base and its opposite end in detachable engagement with said contact blades, and means on said arm for mechanically tripping said catch, as set forth.

4. In electric switches, the combination with a fixed base having mounted thereon contact blades, a locking lever and catch with means for electrically tripping said catch, of a rotatable base, a switch arm having one end in pivotal connection with said rotatable base and its opposite end in detachable engagement with said contact blades, means on said arm for mechanically tripping said catch, spring horns setting up an initial rotary movement of said rotatable base on the tripping of said catch and means for continuing such movement to effect the complete opening of the switch, as set forth.

5. In electric switches, the combination with a plurality of switch arms each forming part of a combination as claimed in claim 1, of mechanical connections between the said rotatable bases carrying said arms whereby on the tripping of any one catch all the said arms are simultaneously opened, as set forth.

6. In electric switches, the combination with a plurality of switch arms each forming part of a combination as claimed in claim 1, of hand operated means for releasing the whole of the said arms simultaneously, as set forth.

In testimony whereof I have signed my name to this specification.

GEORGE PAILIN.